US009143332B2

(12) United States Patent
Nass (10) Patent No.: US 9,143,332 B2
(45) Date of Patent: Sep. 22, 2015

(54) METHOD AND TOOL FOR WIRELESS COMMUNICATIONS WITH SLEEPING DEVICES IN A WIRELESS SENSOR CONTROL NETWORK

(75) Inventor: Geoffrey D. Nass, Rolling Meadows, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 1871 days.

(21) Appl. No.: 12/135,647

(22) Filed: Jun. 9, 2008

(65) Prior Publication Data

US 2009/0082885 A1 Mar. 26, 2009

Related U.S. Application Data

(60) Provisional application No. 60/994,441, filed on Sep. 20, 2007, provisional application No. 60/994,443, filed on Sep. 20, 2007.

(51) Int. Cl.
*H04L 12/12* (2006.01)
*H04L 12/28* (2006.01)
*H04L 12/40* (2006.01)

(52) U.S. Cl.
CPC ............ *H04L 12/12* (2013.01); *H04L 12/2838* (2013.01); *H04L 12/40039* (2013.01); *H04L 2012/2841* (2013.01); *H04L 2012/4026* (2013.01)

(58) Field of Classification Search
CPC .................................................. H04L 12/2838
USPC .................................. 370/338, 337, 325, 339
See application file for complete search history.

(56) References Cited

U.S. PATENT DOCUMENTS

| | | | |
|---|---|---|---|
| 2004/0078117 A1* | 4/2004 | Vanderah et al. ............. | 700/301 |
| 2007/0055756 A1* | 3/2007 | Richards et al. .............. | 709/223 |
| 2007/0055759 A1* | 3/2007 | McCoy et al. ................ | 709/223 |
| 2007/0120652 A1* | 5/2007 | Behnke .................... | 340/286.01 |
| 2007/0161352 A1 | 7/2007 | Dobrowski et al. | |
| 2008/0082183 A1* | 4/2008 | Judge .............................. | 700/33 |
| 2008/0086560 A1* | 4/2008 | Monier et al. ................ | 709/224 |
| 2009/0065596 A1* | 3/2009 | Seem et al. ..................... | 236/51 |

FOREIGN PATENT DOCUMENTS

| WO | 2005/8103851 A1 | 11/2005 |
|---|---|---|
| WO | 2007/104152 A2 | 9/2007 |

* cited by examiner

*Primary Examiner* — Hassan Kizou
*Assistant Examiner* — Abdelnabi Musa (57) ABSTRACT

A method of communicating with automation components configured for use within a building automation system is disclosed. The method includes determining a first communication schedule such that the first communication schedule configured to govern an activity schedule for use by an automation component, communicating the first communication schedule to the automation component such that the automation component currently implements a second communication schedule to govern the activity schedule, and adjusting the second communication schedule to equal the communicated first communication schedule such that the activity schedule increases a communication frequency in response to the adjustment. The method may further include defining a duration during which the first communication schedule equals the second communication schedule.

15 Claims, 5 Drawing Sheets

METHOD AND TOOL FOR WIRELESS COMMUNICATIONS WITH SLEEPING DEVICES IN A WIRELESS SENSOR CONTROL NETWORK

CROSS-REFERENCE TO RELATED APPLICATIONS

This patent claims the priority benefit under 35 U.S.C. §119(e) of U.S. provisional patent application Ser. No. 60/994,441, filed on Sep. 19, 2007, U.S. provisional patent application Ser. No. 60/994,443, filed on Sep. 19, 2007, the content of these applications are incorporated by reference for all purposes.

This patent relates to co-pending U.S. patent application Ser. No. 12/135,670, titled "METHODS TO VERIFY WIRELESS NODE PLACEMENT FOR RELIABLE COMMUNICATION IN WIRELESS SENSOR CONTROL NETWORKS", filed contemporaneously herewith, the content of this applications are incorporated by reference for all purposes.

This patent further relates to co-pending U.S. patent application Ser. No. 11/590,157, filed on Oct. 31, 2006, and co-pending U.S. patent application Ser. No. 10/915,034, filed on Aug. 8, 2004, the contents of these applications are hereby incorporated by reference for all purposes.

BACKGROUND

The present disclosure generally relates to communications within wireless mesh networks operating within a building automation system. In particular, the present disclosure relates to method and tool for communicating with sleeping wireless devices deployed within the building automation system.

A building automation system (BAS) typically integrates and controls elements and services within a structure such as the heating, ventilation and air conditioning (HVAC) system, security services, fire systems and the like. The integrated and controlled systems are arranged and organized into one or more field level networks (FLNS) containing application or process specific controllers, sensors, actuators or other devices distributed to define or establish a network. The field level networks provide general control for a particular floor or region of the structure. For example, a field level network may be an RS-485 compatible network that includes one or more controllers or application specific controllers configured to control the elements or services within floor or region. The controllers may, in turn, be configured to receive an input from a sensor or other device such as, for example, a room temperature sensor (RTS) deployed to monitor the floor or region. The input, reading or signal provided to the controller, in this example, may be a temperature indication representative of the physical temperature. The temperature indication can be utilized by a process control routine such as a proportional-integral control routine executed by the controller to drive or adjust a damper, heating element, cooling element or other actuator towards a predefined set-point.

Information such as the temperature indication, sensor readings and/or actuator positions provided to one or more controllers operating within a given field level network may, in turn, be communicated to an automation level network (ALN) or building level network (BLN) configured to, for example, execute control applications, routines or loops, coordinate time-based activity schedules, monitor priority based overrides or alarms and provide field level information to technicians. Building level networks and the included field level networks may, in turn, be integrated into an optional management level network (MLN) that provides a system for distributed access and processing to allow for remote supervision, remote control, statistical analysis and other higher level functionality. Examples and additional information related to BAS configuration and organization may be found in the co-pending U.S. patent application Ser. No. 11/590, 157, filed on Oct. 31, 2006, and co-pending U.S. patent application Ser. No. 10/915,034, filed on Aug. 8, 2004, the contents of these applications are hereby incorporated by reference for all purposes.

Wireless devices, such as devices that comply with IEEE 802.15.4/ZigBee protocols, may be implemented within the control scheme of a building automation system without incurring additional wiring or installation costs. ZigBee-compliant devices such as full function devices (FFD) and reduced function devices (RFD) may be interconnected to provide a device net or mesh within the building automation system. For example, full function devices are designed with the processing power necessary to establish peer-to-peer connections with other full function devices and/or execute control routines specific to a floor or region of a field level network. Full function devices are typically line powered devices which are always awake and/or active and ready to communicate. Each of the full function devices may, in turn, communicate with one or more of the reduced function devices in a hub and spoke arrangement. Reduced function devices such as the temperature sensor described above are designed with limited processing power necessary to perform a specific task(s) and communicate information directly to the connected full function device. Reduced function devices are typically battery powered devices which remain asleep and/or inactive for extended periods of time to conserve battery power.

SUMMARY

The present disclosure generally provides communicating with wireless devices deployed within a building automation system (BAS). A mobile wireless device or tool may be configured and utilized to manually or automatically communicate with sleeping or inactive wireless devices and/or automation components within the BAS.

In one exemplary embodiment, a method of communicating with automation components configured for use within a building automation system is disclosed. The method includes determining a first communication schedule such that the first communication schedule configured to govern an activity schedule for use by an automation component, communicating the first communication schedule to the automation component such that the automation component currently implements a second communication schedule to govern the activity schedule, and adjusting the second communication schedule to equal the communicated first communication schedule such that the activity schedule increases a communication frequency in response to the adjustment.

In another embodiment, a mobile device for communicating with automation components within a building automation system is disclosed. The device includes a processor in communication with a memory. The processor may be configured to determine a first communication schedule, the first communication schedule configured to govern an activity schedule for use by an automation component, communicate the first communication schedule to the automation component via a wireless communication component, wherein the automation component currently implements a second communication schedule to govern the activity schedule, and adjust the second communication schedule within the automaton component to equal the communicated first communication schedule, wherein the activity schedule increases a communication frequency in response to the adjustment.

Additional features and advantages of the present invention are described in, and will be apparent from, the following Detailed Description and the figures.

BRIEF DESCRIPTION OF THE FIGURES

The method, tool and teaching provided relate to communications between automation components operating within a building automation system (BAS).

DETAILED DESCRIPTION

The embodiments discussed herein include automation components, wireless communication components and/or transceivers. The devices may be IEEE 802.15.4/ZigBee-compliant automation components such as: a personal area network (PAN) coordinator which may be implemented as a field panel transceiver (FPX); a full function device (FFD) implemented as a floor level device transceiver (FLNX); and a reduced function device (RFD) implemented as a wireless room temperature sensor (WRTS) that may be utilized in a building automation system (BAS). The devices identified herein are provided as an example of automation components, wireless devices and transceivers that may be integrated and utilized within a building automation system embodying the teachings disclosed herein and are not intended to limit the type, functionality and interoperability of the devices and teaching discussed and claimed herein. Moreover, the disclosed building automation system describes automation components that may include separate wireless communication components and transceivers, however it will be understood that that the wireless communication component and transceiver may be integrated into a single automation component operable within the building automation system.

One exemplary building automation system that may include the devices and be configured as described above is the APOGEE® system provided by Siemens Building Technologies, Inc. The APOGEE® system may implement RS-485 wired communications, Ethernet, proprietary and standard protocols, as well as known and/or foreseeable wireless communications standards such as, for example, IEEE 802.15.4 wireless communications which are compliant with the ZigBee standards and/or ZigBee certified wireless devices or automation components. ZigBee standards, proprietary protocols or other standards are typically implemented in embedded applications that may utilize low data rates and/or require low power consumption. Moreover, ZigBee standards and protocols are suitable for establishing inexpensive, self-organizing, mesh networks which may be suitable for industrial control and sensing applications such as building automation. Thus, automation components configured in compliance with ZigBee standards or protocols may require limited amounts of power allowing individual wireless devices, to operate for extended periods of time on a finite battery charge.

The wired or wireless devices such as the IEEE 802.15.4/ZigBee-compliant automation components may include, for example, an RS-232 connection with an RJ-11 or other type of connector, an RJ-45 Ethernet compatible port, and/or a universal serial bus (USB) connection. These wired, wireless devices or automation components may, in turn, be configured to include or interface with a separate wireless transceiver or other communications peripheral thereby allowing the wired device to communicate with the building automation system via the above-described wireless protocols or standards. Alternatively, the separate wireless transceiver may be coupled to a wireless device such as a IEEE 802.15.4/ZigBee-compliant automation component to allow for communications via a second communications protocol such as, for example, 802.11x protocols (802.11a, 802.11b ... 802.11n, etc.) or any other communication protocol. These exemplary wired, wireless devices may further include a man-machine interface (MMI) such as a web-based interface screen that provide access to configurable properties of the device and allow the user to establish or troubleshoot communications between other devices and elements of the BAS.

Figure 1:
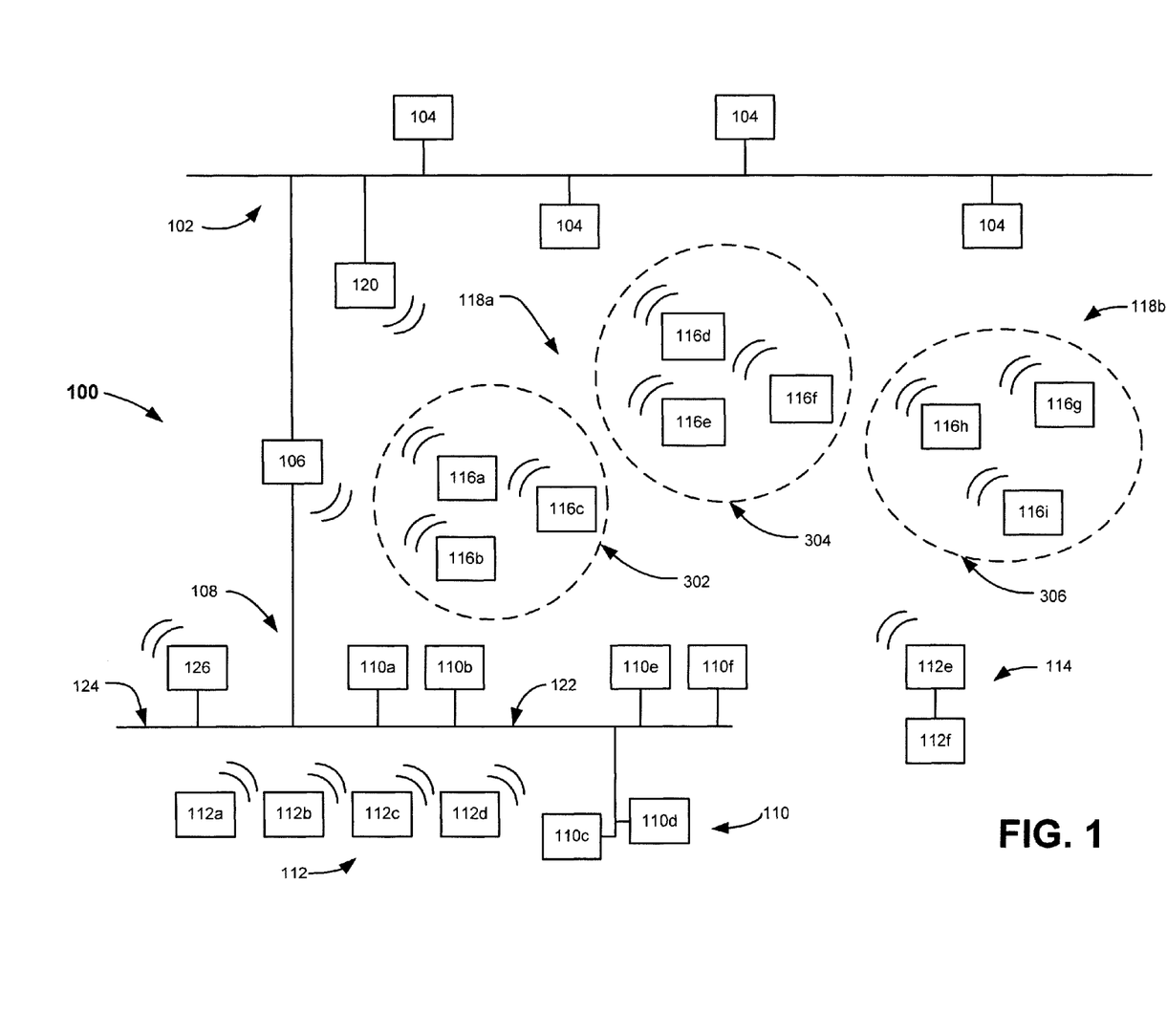
FIG. 1 illustrates an embodiment of a building automation system configured in accordance with the disclosure provided herein.

FIG. 1 illustrates an exemplary building automation system or control system 100 that may incorporate the methods, systems and teaching provided herein. The control system 100 includes a first network 102 such as an automation level network (ALN) or management level network (MLN) in communication with one or more controllers such as a plurality of terminals 104 and a modular equipment controller (MEC) 106. The MEC or controller 106 is a programmable device which may couple the first network 102 to a second network 108 such as a field level network (FLN). The first network 102 may be wired or wirelessly coupled or in communication with the second network 108. The second network 108, in this exemplary embodiment, may include a first wired network portion 122 and a second wired network portion 124 that connect to building automation components 110 (individually identified as automation components 110a to 110f). The second wired network portion 124 may be coupled to wireless building automation components 112 via the automation component 126. For example, the building automation components 112 may include wireless devices individually identified as automation components 112a to 112f. In one embodiment, the automation component 112f may be a wired device, that may or may not, include wireless functionality, that connects to the automation component 112e. In this configuration, the automation component 112f may utilize or share the wireless functionality provided by the automation component 112e to define an interconnected wireless node 114. The automation components 112a to 112f may, in turn, communicate or connect to the first network 102 via, for example, the controller 106 and/or an automation component 126. The automation component 126 may be a field panel, FPX or another full function device in communication with the second wired network portion 124 which, in turn, may be in communication with the first network 102.

The control system 100 may further include automation components 116 which may be individually identified by the reference numerals 116a to 116i. The automation components 116a to 116i may be configured or arranged to establish one or more wireless sensor and control networks (WSCN) such as the mesh networks 118a and 118b. The automation components 116a to 116i such as, for example, full or reduced function devices and/or configurable terminal equipment controllers (TEC), may cooperate to wirelessly communicate information between the first network 102, the control system 100 and other devices within the mesh networks or subnets 118a and 118b. For example, the automation component 116a may communicate with other automation components 116b to 116f within the mesh network 118a by sending a message addressed to the network identifier, alias and/or media access control (MAC) address assigned to each of the interconnected automation components 116a to 116f and/or to a field panel 120. In one configuration, the individual automation components 116a to 116f within the mesh network 118a may communicate directly with the field panel 120 or alternatively, the individual automation components 116a to 116f may be configured in a hierarchal manner such that only one of the components, for example, automation component 116c, communicates with the field panel 120. The automation components 116g to 116i of the mesh network 118b may, in turn, communicate with the individual automation components 116a to 116f of the mesh network 118a or the field panel 120.

The automation components 116a to 116i deployed within the mesh networks 118a, 118b may be battery-powered long life devices configured to "sleep" or remain inactive in a low powered state. Alternatively, one or more of the one or more of the automation components 116a to 116i may be line-powered devices configured to remain "awake" or active all of the time. For example, the controller 106 may be a line powered "parent" to the "children" devices, which in this example are the automation components 116a to 116f, of the mesh network 118a. When, for example, the automation component 116a, which may be a battery powered device, awakens or reactivates from a predefined sleep period, it may be configured to poll, check or otherwise communicate with the parent controller 106. The polling or communications between the automation component 116a and the controller 106 serves, in this example, to transfer any messages, commands and/or instructions stored on the controller 106 which may have been directed towards the automation component 116a during the predefined sleep or inactive period.

The automation components 112e and 112f defining the wireless node 114 may wirelessly communicate with the second network 108, and the automation components 116g to 116i of the mesh network 118b to facilitate communications between different elements, sections and networks within the control system 100. Wireless communication between individual automation components 112, 116 and/or the mesh networks 118a, 118b may be conducted in a direct or point-to-point manner, or in an indirect or routed manner through the nodes or devices comprising the nodes or networks 102, 108, 114 and 118. In an alternate embodiment, the first wired network portion 122 is not provided, and further wireless connections may be utilized.

Figure 2:
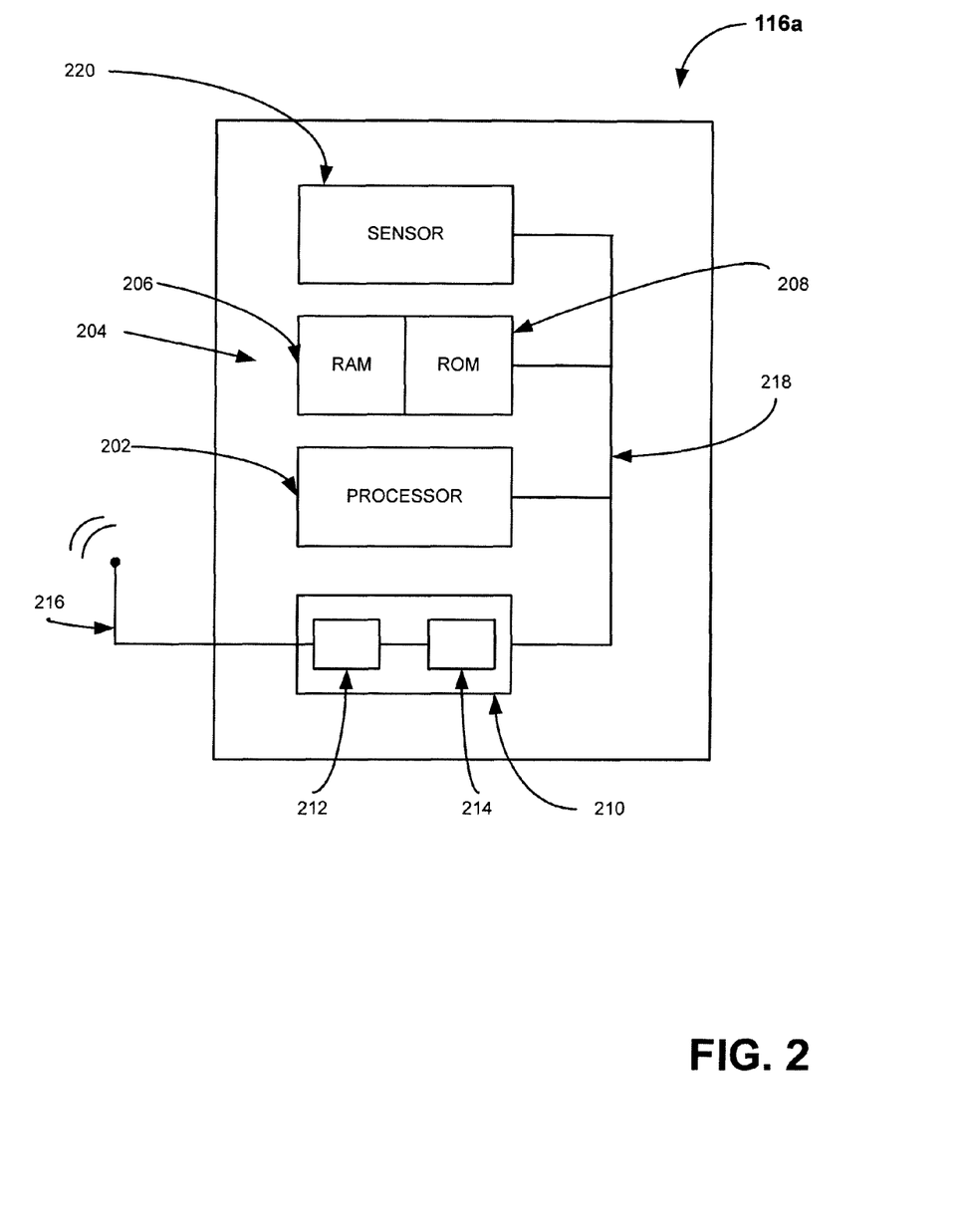
FIG. 2 illustrates an embodiment of a wireless device or automation component that may be utilized in connection with the building automation system shown in FIG. 1.

FIG. 2 illustrates an exemplary detailed view of one automation component 116a to 116i. In particular, FIG. 2 illustrates the automation component 116a. The automation component 116a may be a full function device or a reduced function device. While the automation component 116a is illustrated and discussed herein, the configuration, layout and componentry may be utilized in connection with any of the automation components deployed within the control system 100 shown and discussed in connection with FIG. 1. The automation component 116a in this exemplary embodiment may include a processor 202 such as an INTEL® PENTIUM®, an AMD® ATHLON® or other 8, 12, 16, 24, 32 or 64 bit classes of processors in communication with a memory 204 or storage medium. The memory 204 or storage medium may contain random access memory (RAM) 206, flashable or non-flashable read only memory (ROM) 208 and/or a hard disk drive (not shown), or any other known or contemplated storage device or mechanism. The automation component may further include a communication component 210. The communication component 210 may include, for example, the ports, hardware and software necessary to implement wired communications with the control system 100. The communication component 210 may alternatively, or in addition to, contain a wireless transmitter 212 and a receiver 214 (or an integrated transceiver) communicatively coupled to an antenna 216 or other broadcast hardware.

The sub-components 202, 204 and 210 of the exemplary automation component 116a may be coupled and configured to share information with each other via a communications bus 218. In this way, computer readable instructions or code such as software or firmware may be stored on the memory 204. The processor 202 may read and execute the computer readable instructions or code via the communications bus 218. The resulting commands, requests and queries may be provided to the communication component 210 for transmission via the transmitter 212 and the antenna 216 to other automation components 200, 112 and 116 operating within the first and second networks 102 and 108. Sub-components 202 to 218 may be discrete components or may be integrated into one (1) or more integrated circuits, multi-chip modules, and or hybrids.

The exemplary automation component 116a may be, for example, a WRTS deployed or emplaced within the structure. In operation, the WRTS may monitor or detect the temperature within a region or area of the structure. A temperature signal or indication representative of the detected temperature may further be generated by the WRTS. In another embodiment, the automation component 116a may be, for example, an actuator coupled to a sensor or other automation component. In operation, the actuator may receive a signal, indication or command from another automation component 116b to 116i and adjust the position of a mechanical component in accordance with the received signal. The command or indication may be stored or saved within the memory 204 for later processing or communication to another component within the control system 100.

Figure 3:
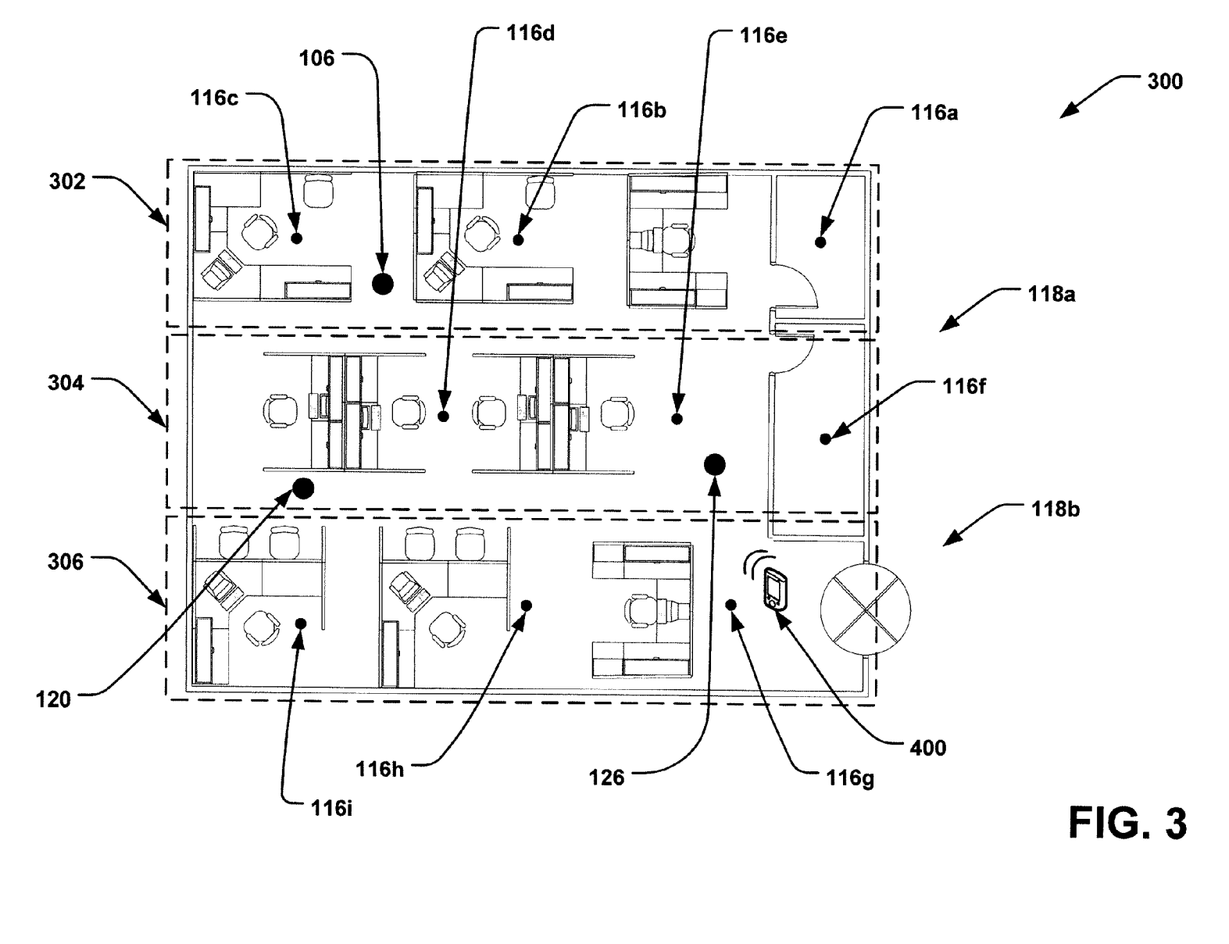
FIG. 3 illustrates an exemplary physical layout for a field level network including one or more automation components and/or mesh networks.

FIG. 3 illustrates an exemplary physical configuration 300 of automation components 116a to 116i that may be implemented in the control system 100. For example, the configuration 300 may represent a wireless FLN, such as the second network 108, including the first and second mesh networks 118a, 118b. The exemplary configuration 300 illustrates a structure in which the first mesh network 118a includes two zones 302 and 304 and the second mesh network 118b includes the zone 306. The zones, in turn, include automation components 116a to 116i. For example, zone 302 includes automation components 116a to 16c, zone 304 includes automation components 116d to 116f and zone 306 includes automation components 116g to 116i. Zones, mesh networks and automation components may be deployed within the structure in any know manner or configuration to provide sensor coverage for any space of interest therein.

As previously discussed, the automation components 116a to 116i may, in operation within the control system 100, be configured to control and monitor building systems and functions such as temperature, air flow, etc. In order to execute their intended functions within the control system 100, the deployed automation components 116a to 116i are required to communicate with each other and, for example, the controller 106, the field panel 120 and/or the automation component 126.

Figure 4:
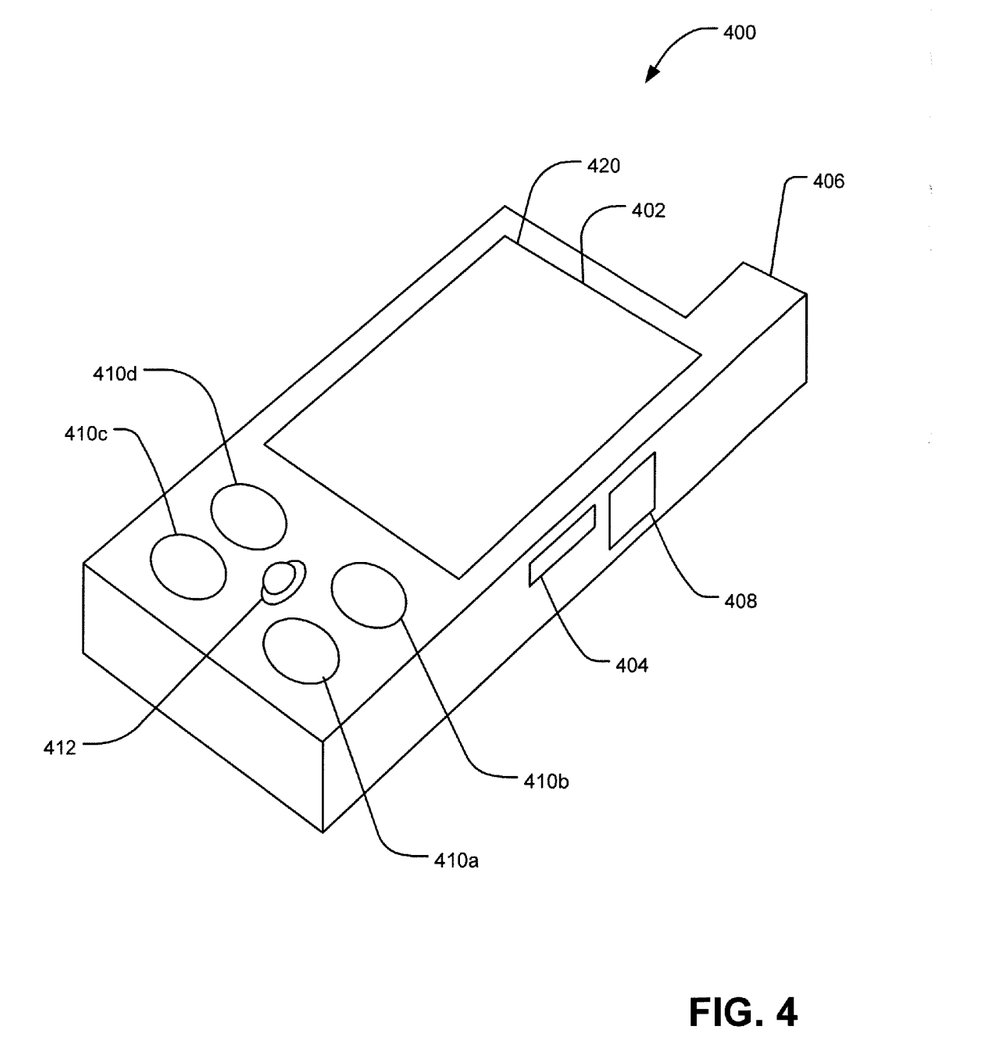
FIG. 4 illustrates a mobile device for use in verifying communications between one or more automation components and/or mesh networks.

FIG. 4 illustrates an exemplary embodiment of the mobile tool or device 400 that may be utilized in cooperation with the one or more of the automation components 116a to 116i to perform site surveys, commission and diagnostic functions related to the configuration 300 and the control system 100.

The mobile device 400 may be, for example, a laptop computer, a personal digital assistant (PDA) or smart phone utilizing, for example, Advanced RISC Machine (ARM) architecture or any other system architecture or configuration. The mobile device 400, in this exemplary embodiment, may utilize one or more operating systems (OS) or kernels such as, for example, PALM OS®, MICROSOFT MOBILE®, BLACKBERRY OS®, SYMBIAN OS® and/or an open LINUX™ OS. These or other well known operating systems could allow programmers to create a wide variety of programs, software and/or applications for use with the mobile device 400.

The mobile device 400 may include a touch screen 402 for entering and/or viewing configuration information or data, a memory card slot 404 for data storage and memory expansion. The memory card slot 404 may further be utilized with specialized cards and plug-in devices such as, for example, a wireless networking card, to expand the capabilities of functionality of the mobile device 400. The mobile device 400 may include an antenna 406 to facility connectivity via one or more communication protocols such as: WiFi (WLAN); Bluetooth or other personal area network (PAN) standard; cellular communications and/or any other communication standard disclosed herein or foreseeable. The mobile device 400 may further include an infrared (IR) port 408 for communication via the Infrared Data association (IrDA) standard. The mobile device 400 may be configured and designed with a communication component similar to, and compatible with, the communication component 210 shown and discussed in connection with FIG. 2. The communication components utilized within the one or more of the automation components and the mobile device 400 may be selected and configured to be inter-compatible and compliant with any one of the communication protocols or standards discussed herein. The mobile device 400 may, in an embodiment, include or incorporate the components, elements and/or functionality deployed within the automation component 200 shown in FIG. 2.

Hard keys 410a to 410d may be provided to allow direct access to predefined functions or entrance of information via a virtual keyboard provided via the touch screen 402. The number and configuration of the hard keys may be varied to provide, for example, a full QWERTY keyboard, a numeric keyboard or any other desired arrangement. The mobile device 400 may further include a trackball 412, toggle or other navigation input for interaction with emergency information or data presented on the touch screen 402.

The mobile device 400 may be configured to communicate with the deployed automation components 116a to 116i and one or more of the controller 106, the field panel 120 and/or the automation component 126. Moreover, the mobile device 400 may be configured to communicate with the battery powered or "sleeping" devices, e.g., one or more of the automation components 116a to 116i, utilizing a special or dedicated "WAKEUP" command which may be transmitted directly from the mobile device 400 or via the controller 106, the field panel 120 and/or the automation component 126 associated with the sleeping automation component of interest.

Figure 5:
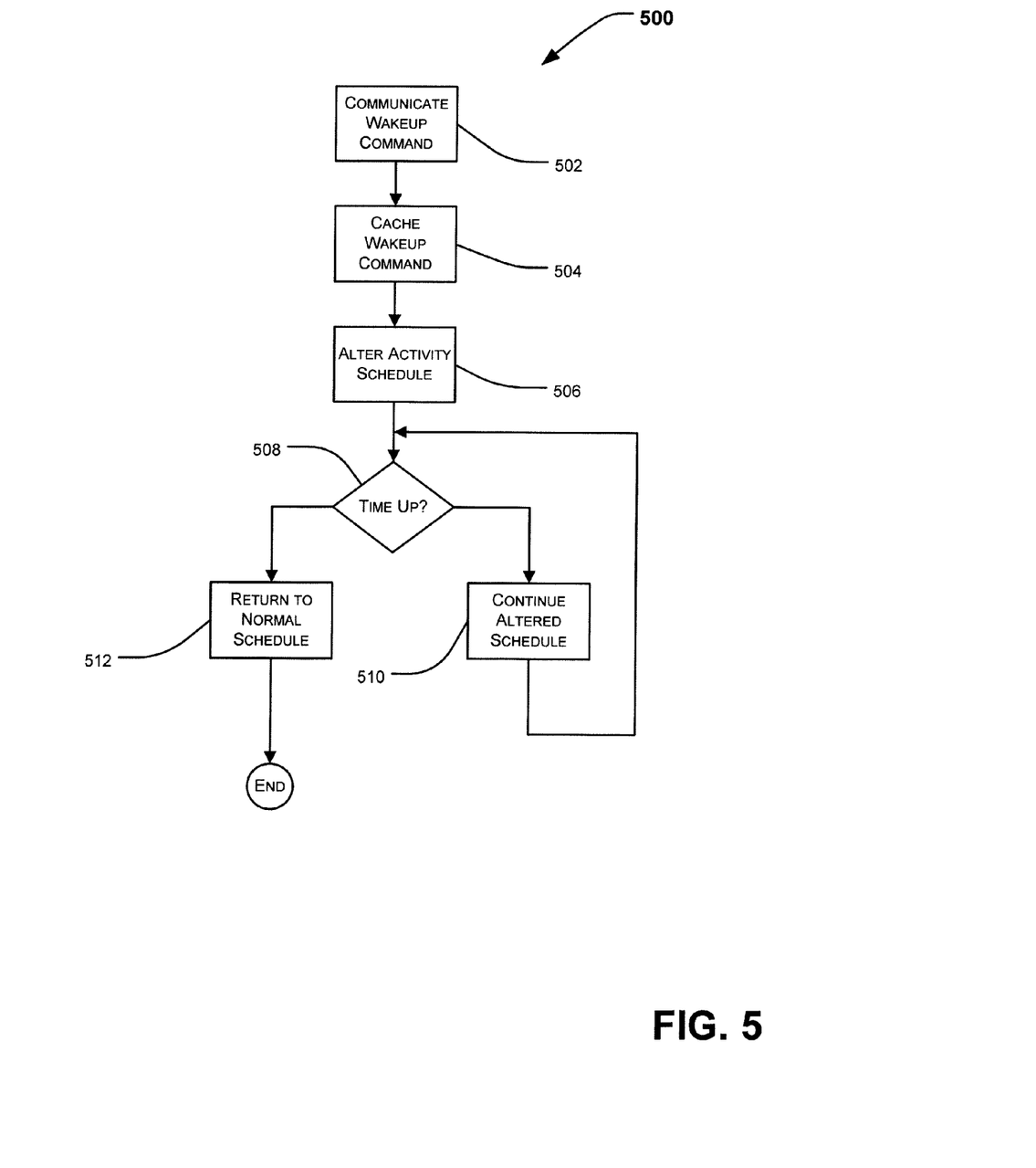
FIG. 5 illustrates an exemplary flowchart representative of a communication operation utilizing the disclosed command and teaching

FIG. 5 illustrates a flowchart 500 detailing the exemplary operation of the mobile device 400 within the configuration 300. In particular, the flowchart 500 illustrates an exemplary method or algorithm for communicating with one or more of the automation components 116a to 116i (see FIG. 3) which may be inactive/asleep, e.g., the internal components of the automation components 116a including components 202, 204, 210 and 220. The method provides for communication with one or more of the automation components 116a to 116i either directly or via the controller 106, the field panel 120 and/or the automation component 126, etc. The disclosed communication may include a specialized "WAKEUP" command configured to alter or modify the inactive or sleep schedule of the automation component(s) 116a to 116i.

At block 502, the mobile device 400 may communicate the special or dedicated WAKEUP command to all of the sleeping or inactive automation components 116a to 116i within the mesh networks 118a and 118b. The WAKEUP command may specify how frequently one or more of the automation components 116a to 116i transitions for "sleep" mode to "awake" mode to communicate with the mobile device 400 and how long a normal sleep/wake schedule should be overridden by the schedule communicated by the WAKEUP command. For example, in order to conserve battery power one or more of the automation components 116a to 116i may activate once every sixty (60) seconds.

At block 504, the WAKEUP command communicate by the mobile device 400 may be received and cached by one or more of the full function devices such as the controller 106, the field panel 120 and/or the automation component 126 shown in FIGS. 1 and 3. The stored or cached WAKEUP command may, in turn, be communicated to one or more of the automation components 116a to 116i which may be asleep or inactive when the WAKEUP command was initially communicated. Thus, when the sleeping one or more of the automation components 116a to 116i wakes up and polls its associated full function device for new messages, the WAKEUP command may be delivered.

At block 506, the automation components 116a to 116i may respond to the received WAKEUP command. For example, the WAKEUP command may include instructions and values for altering the activity schedules for the automation components 116a to 116i. The WAKEUP command may direct one or more of the automation components 116a to 116i to activate once a second and/or to remain awake for thirty (30) seconds out of every sixty (60) seconds, e.g., activate once every two (2) seconds. Alternatively, the WAKEUP command may direct one or more of the automation components 116a to 116i to remain awake continuously for a period of time, until commanded to resume a normal activity schedule. In one example, the automation component 116a may be commanded, via the WAKEUP command, to activate once a second for a duration of twenty (20) minutes.

At block 508, a timer, typically a clock timer associated with the processor 202, may be utilized to determine if the allotted duration of twenty (20) minutes has elapsed. If the period or duration has not elapsed, then at block 510, the automation components 116a from the previous example, may continue to implement the altered activity schedule and evaluate the duration at the block 508. If the period or duration has elapsed, then at block 512, the automation components 116a from the previous example, may return to the normal or standard activity schedule originally implemented before receipt of the WAKEUP command.

By altering the activity schedule of one or more of the automation components 116a to 116i, the mobile device 400 may establish a direct communication link with the automation components 116a to 116i. The direct communication link eliminates the need for the controller 106, the field panel 120 and/or the automation component 126 to cache and store data from the automation components 116a to 116i which, in turn, shortens the overall communication time. The shorten overall communication time may extend the battery life of the reduced function device, automation component 116a in this example, because entire message may be sent as opposed to multiple partial messages. Moreover, the mobile device 400 receives more accurate information via the direct communication link as opposed to delayed data cached and stored on the controller 106, the field panel 120 and/or the automation component 126.

The reduced function device may experience extended battery life because it can temporarily remain in an active state to communicate and/or receive instructions, etc. In this way, the reduced function device does not have to continually power up and/or activate to poll for messages, rather the reduced function device may typically maintain, i.e., when not modified by the WAKEUP command, a power saving routine that extends the sleeping device battery life.

It should be understood that various changes and modifications to the presently preferred embodiments described herein will be apparent to those skilled in the art. For example, the elements of these configurations could be arranged and interchanged in any known manner depending upon the system requirements, performance requirements, and other desired capabilities. In yet another example, the functionality deployed on the mobile device 400 may be deployed and utilized on one or more of the full function devices. In yet another embodiment, the functionality deployed on the mobile device 400 may be automatically triggered and operated throughout the set up, configuration and installation of the control system 100. Well understood changes and modifications can be made based on the teachings and disclosure provided by the present invention and without diminishing from the intended advantages disclosed herein. It is therefore intended that such changes and modifications be covered by the appended claims.

What is claimed is:

1. A method of communicating with automation components configured for use within a building automation system, the method comprising:
   determining a first communication schedule, the first communication schedule configured to govern an activity schedule for use by an automation component, the first communication schedule being to direct activation of the automation component for communication;
   defining a duration of time the first communication schedule is to be implemented;
   communicating the first communication schedule and the duration of time the first communication schedule is to be implemented to the automation component, wherein the automation component currently implements a second communication schedule to govern the activity schedule;
   adjusting the second communication schedule to equal the communicated first communication schedule, wherein the activity schedule increases a communication frequency in response to the adjustment from the second communication schedule to the communicated first communication schedule; and
   implementing the second communication schedule once the duration of time elapses after the adjustment.

2. The method of claim 1, wherein determining the first communication schedule includes identifying a target communication frequency.

3. The method of claim 2, wherein identifying the target communication frequency includes identifying a duration.

4. The method of claim 1, wherein the activity schedule includes a first period associated with an inactive period and a second period associated with an active period, wherein the first period is longer than the second period.

5. The method of claim 1, wherein the first communication schedule directs the automation component to activate for communication one second out of every two seconds.

6. The method of claim 1, further comprising:
   establishing a direct communication link between the automation component and a device.

7. The method of claim 1, wherein the device is a mobile device.

8. The method of claim 1, wherein communicating the first communication schedule to the automation component includes communicating the first communication schedule to the automation component via a second automation component.

9. A mobile device for communicating with automation components within a building automation system, the mobile device comprising:
   a processor in communication with a memory, the processor configured to:
      determine a first communication schedule, the first communication schedule configured to govern an activity schedule for use by an automation component, the first communication schedule to direct activation of the automation component for communication;
      define a duration of time the first communication schedule is to be implemented;
      communicate the first communication schedule and the duration of time the first communication schedule is to be implemented to the automation component via a wireless communication component, wherein the automation component currently implements a second communication schedule to govern the activity schedule; and
      adjust the second communication schedule within the automaton component to equal the communicated first communication schedule for the communicated duration of time the first communication schedule is to be implemented, wherein the activity schedule increases a communication frequency in response to the adjustment from the second communication schedule to the communicated first communication schedule.

10. The device of claim 9, wherein the processor is configured to utilize a target communication frequency to determine the first communication schedule.

11. The device of claim 10, wherein the target communication frequency includes a duration.

12. The device of claim 9, wherein the activity schedule includes a first period associated with an inactive period and a second period associated with an active period, wherein the first period is longer than the second period.

13. The device of claim 9, wherein the first communication schedule directs the automation component to activate for communication one second out of every two seconds.

14. The device of claim 9, wherein the wireless communication component is configured to establish a direct communication link to the automation component.

15. The device of claim 9, wherein the communicated first communication schedule to the automation component is communicated to the automation component via a second automation component.

* * * * *